UNITED STATES PATENT OFFICE.

JAMES H. STEBBINS, JR., OF NEW YORK, N. Y.

IMPROVEMENT IN COLORS FROM PICRIC ACID.

Specification forming part of Letters Patent No. 221,115, dated October 28, 1879; application filed April 23, 1879.

*To all whom it may concern:*

Be it known that I, JAMES H. STEBBINS, Jr., of the city, county, and State of New York, have invented a new and useful Improvement in Coloring-Matters from Picric Acid, which improvement is fully described in the following specification.

This improvement relates to a yellow-orange coloring-matter produced by the reaction of diazo-benzole nitrate on picric acid.

In carrying out my invention I dissolve picric acid in alcohol, and then add to it an aqueous solution of diazo-benzole nitrate. For the alcoholic solution of picric acid I use ten ounces of picric acid and one hundred ounces of alcohol, and for the aqueous solution of diazo-benzole nitrate I use one ounce of diazo-benzole nitrate and one hundred ounces of water. In a few seconds the contents of the vessel become nearly one solid mass of long brown crystals. These must be rapidly collected on a filter, since they are decomposed by a short contact with the mother-liquor.

The mother-liquor is evaporated by half its bulk, and let stand for about ten hours. At the end of that time the whole mass has assumed the form of dark-orange crystals, which are dried between filter-papers and purified by recrystallization.

These dark-orange crystals constitute my new coloring-matter, which I have termed "picridine." It dissolves readily in alcohol and ether, also in dilute hydrochloric acid, but is nearly insoluble in water; but by transforming it into a soda-salt, it is rendered soluble in water. It dyes silk of an orange-yellow color without mordants. Wool is dyed a light yellow when mordanted with tannic acid.

What I claim as new, and desire to secure by Letters Patent, is—

As a new manufacture, the coloring-matter or dye-stuff obtained from the reaction of diazo-benzole nitrate and picric acid, substantially in the manner set forth, or by any other method which will produce a like result.

In testimony that I claim the foregoing I have hereunto set my hand and seal this 19th day of April, 1879.

JAMES H. STEBBINS, JR. [L. S.]

Witnesses:
 W. HAUFF,
 E. F. KASTENHUBER.